United States Patent [19]
Harris et al.

[11] Patent Number: 4,802,183
[45] Date of Patent: Jan. 31, 1989

[54] MICROWAVE EXCITED EXCIMER LASER AND METHOD

[75] Inventors: Stephen E. Harris, Palo Alto; James F. Young, Stanford, both of Calif.

[73] Assignee: Board of Trustees of the Leland Stanford Junior University, Stanford, Calif.

[21] Appl. No.: 366,384

[22] Filed: Apr. 7, 1982

[51] Int. Cl.⁴ ............................................. H01S 3/22
[52] U.S. Cl. .................................... 372/57; 372/69; 372/82; 372/86; 372/60
[58] Field of Search ................. 372/57, 82, 86, 58, 372/69, 59, 60

[56] References Cited
PUBLICATIONS

Mendelsohn et al; "A Microwave-Pumped XeCl* Laser", *Appl. Phys. Lett.*, vol. 38, No. 8, Apr. 15, 1981.
Mendelsohn et al; "Microwave Pumped Excimer Lasers", CLEO '81, pp. 112-114, Jun. 10-12, 1981.

*Primary Examiner*—William L. Sikes
*Assistant Examiner*—Léon Scott, Jr.
*Attorney, Agent, or Firm*—Flehr, Hohbach, Test, Albritton & Herbert

[57] ABSTRACT

A microwave pumped excimer laser and method.

15 Claims, 3 Drawing Sheets

MICROWAVE EXCITED EXCIMER LASER AND METHOD

"This invention was made with Government support under Contract F49620-80-C-0023 awarded by the Department of the Air Force. The Government has certain rights in this invention."

This invention relates generally to excimer lasers and more particularly to microwave excited excimer lasers and method.

Excimer or exciplex lasers are laser systems using gas-phase molecular species in which the upper laser level is a bound, stable state and the lower level is an unbound, unstable dissociative state. This quasi-molecular system has been termed an "excimer" or "exciplex", and is derived from a contraction of "excited state molecule" or "excited state complex", since the "molecule", or atomic complex exists only in the excited state. Appropriate sets of states are found in many combinations of atoms including all the noble or rare gases. For example, molecules formed of two Xe atoms, $Xe_2$, do not exist, but excited state molecules do exist, $Xe_2^*$, where the "*" indicates an excited, energetic state. If such a state is formed it normally lasts until it emits a photon and makes a transition to the lower, unbound state, and flies apart: $Xe_2^* \rightarrow Xe + Xe + photon$.

The general requirement for net laser gain is that there be more population (atoms or molecules) in the upper, energetic level than in the lower level. Since excimers exist only in the upper level a population inversion has been obtained if any are created. In addition, all of the population can be extracted and contribute to the laser energy.

The first excimer lasers were made using $Xe_2^*$ and $Ar_2^*$. The rare-gas halogen excimers are based on the same principle, but are formed by a rare gas atom (Column VIII of the periodic chart: Ne, Ar, Kr, Xe) and a halogen atom (Column VII of the periodic chart: F, Cl, Br, I). An even newer class are the metal-halide systems such as $HgBr^*$. Following is a table showing typical, or some excimer laser systems and their wavelengths:

| Species | Wavelength |
|---|---|
| $Ar_2$ | 125 nm |
| $Kr_2$ | 146 |
| $Xe_2$ | 173 |
| XeCl | 308 |
| XeF | 351 |
| ArF | 193 |
| KrF | 249 |
| KrCl | 222 |
| XeBr | 282 |
| HgBr | 500 |

Thus the primary problem of making an excimer laser reduces to one of creating the excited state atomic complex, such as $Xe_2^*$ or $XeCl^*$. The various kinetic processes which result in the production of such species have been studied extensively. The two dominant formation channels are ionic combination, e.g., $Xe^+ + Cl^- + M \rightarrow XeCl^* + M$, and neutral collisions with excited atoms, e.g., $Xe^* + HCl \rightarrow XeCl^* + H$. In the first case M represents the required third body necessary to conserve both momentum and energy in the collision In the second case, the H from the "donor" molecule HCl can perform this function, if it is available. Other collisions requiring a third body are also important, such as, $Xe^* + Cl + M \rightarrow XeCl^* + M$. The important point is that the rate of formation of the excimers is dependent on the rate of such 3-body collisions and thus is very sensitive to the total pressure High pressures are necessary (>1 atm) so that the formation rates exceed the natural radiative lifetime of the excimer levels, typically 10 nS. For a number of reasons, including corrosive properties, excitation efficiency, and optical losses, excimer lasers are usually made using a high pressure "inert" buffer gas (usually He, Ne, or Ar) to provide a high density of "third body" collision partners, "doped" with a small percentage of the "active" ingredients, e.g. Xe, and HCl or $Cl_2$. For example, our best mixtures were 0.3% Xe, 0.05% HCl, and 99.5% Ne at a total pressure of 2 atm or greater. For conventional discharge pumped excimer lasers the mixture might be 5% Xe, 0.2% HCl and 94.8% He, Ne, or Ar.

Although high pressures are necessary and desirable for excimer lasers such pressures make it difficult to couple energy into the system to create the necessary excited atoms or ions. The first lasers used electron beam excitation, which is effective, but very complex, expensive, inefficient, and has a low pulse repetition rate. Present commercial systems use pulsed, avalanche electric discharge between two parallel plates on each side of the gas. This works but has a number of stability problems. The discharge is sensitive to gas composition, electrode irregularities, uniformity of preionization and the characteristics of the driving source. These result in very short gain times, and therefore laser pulses, before the discharge turns into an arc, or spark. The severity of this problem is directly proportional to the pressure and limits operation to near 1 or 2 atmospheres. It also influences the choice of gas mixtures. For such short times the laser light cannot make many (usually no more than 2) passes through the laser and thus there is little or no opportunity to use standard laser techniques to refine and modify the characteristics of the output light. Such techniques include spatial mode control, frequency tuning, linewidth narrowing, and mode locking to form very short, high peak power pulses. All of these techniques generally require a number of transits of the light through the modifying element (filter, modulator, etc.) and thus long periods of effective excitation and gain.

Because of its instability, the discharge can effectively excite the gas only for periods of about 20 nS. Special experimental techniques using electron beams, or x-rays have extended this, but are not presently commercially viable.

Excimer lasers are important because they provide high power in the difficult to access UV spectral region. In addition they are efficient and scalable to large volume and energy. However, the present methods for excitation of the molecule or complex have not proved completely satisfactory.

We have discovered that the molecules or complexes can be excited at high pressures with high power microwave energy. The microwave excitation of high pressure gases is much less sensitive to details of the plasma. The power deposition is independent of gas composition. Uniform preionization, or even ionization, is not critical. Local discharges or arcs, which are deleterious in discharge excitation, do not prevent microwave excitation in other regions of the plasma.

It is an object of the present invention to provide an improved excimer laser and method.

It is another object of the present invention to provide an excimer laser in which the lasing species are excited or pumped into their upper or energetic level by microwave energy.

It is another object of the present invention to provide an improved method for exciting the lasing species in an excimer laser.

These and other objects of the invention are achieved by an excimer laser including excimer lasing species and means for exciting or pumping said lasing species with microwave energy and the method of exciting or pumping said lasing species with microwave energy.

The invention will be more clearly understood from the following description read in conjunction with the accompanying drawings of which FIG. 1 is a schematic diagram of a microwave pumped laser accordance with the invention.

Figure 1:
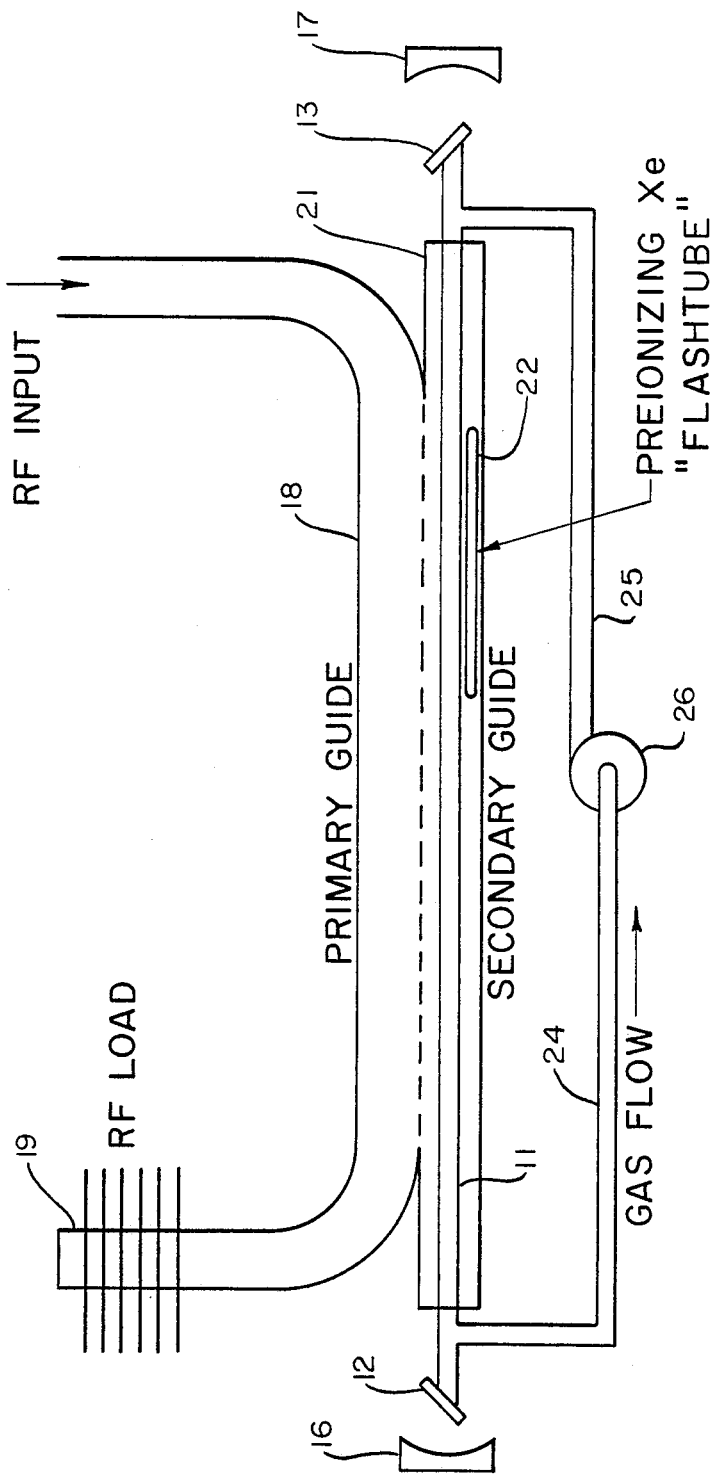

Referring to FIG. 1 the laser includes a resonator cavity including a quartz tube 11 containing the lasing species and sealed with windows 12 and 13, disposed at Brewster angles. External mirrors 16 and 17 further define the cavity. Suitable means are provided for coupling the microwave energy into the lasing species to pump or excite the species. Microwave energy from a suitable source such as a magnetron is coupled or supplied to one end of the primary waveguide 18. The other end 19 of the waveguide is suitably terminated to prevent reflections. The microwave energy is coupled from the primary waveguide into the secondary waveguide 21 which contains the quartz tube 11. Typically, tubes having a 3 mm .d. and an active length of 40 cm are used. The waveguides are pressurized with $SF_6$ to prevent breakdown at high microwave powers. The microwave coupler consists of a series of slots in the common broad wall of the two guides. The size and spacing of the slots are adjusted to provide nearly uniform transfer of energy along the length. Using such techniques 80–90% of the input microwave energy can be absorbed in the gas mixture over a wide range of mixtures and pressures. For low power microwave inputs the discharge is more stable and reproducible if it is initiated by a small amount of preionization. This was accomplished by placing a sealed quartz tube 22 containing ~1 torr of Xe in the secondary waveguide 21. This low pressure "flashlamp" breaks down early in the microwave pulse providing simple, self-timed UV preionization of the laser mixture. At input powers above 0.7 MW the preionization is not necessary. In either case, once the discharge is initiated the power reflected to the source is insignificant An all-stainlesssteel closed loop system including pipes 25 and 24 and pump 26 is used to circulate the gas mixture through the plasma tube.

Figure 2:
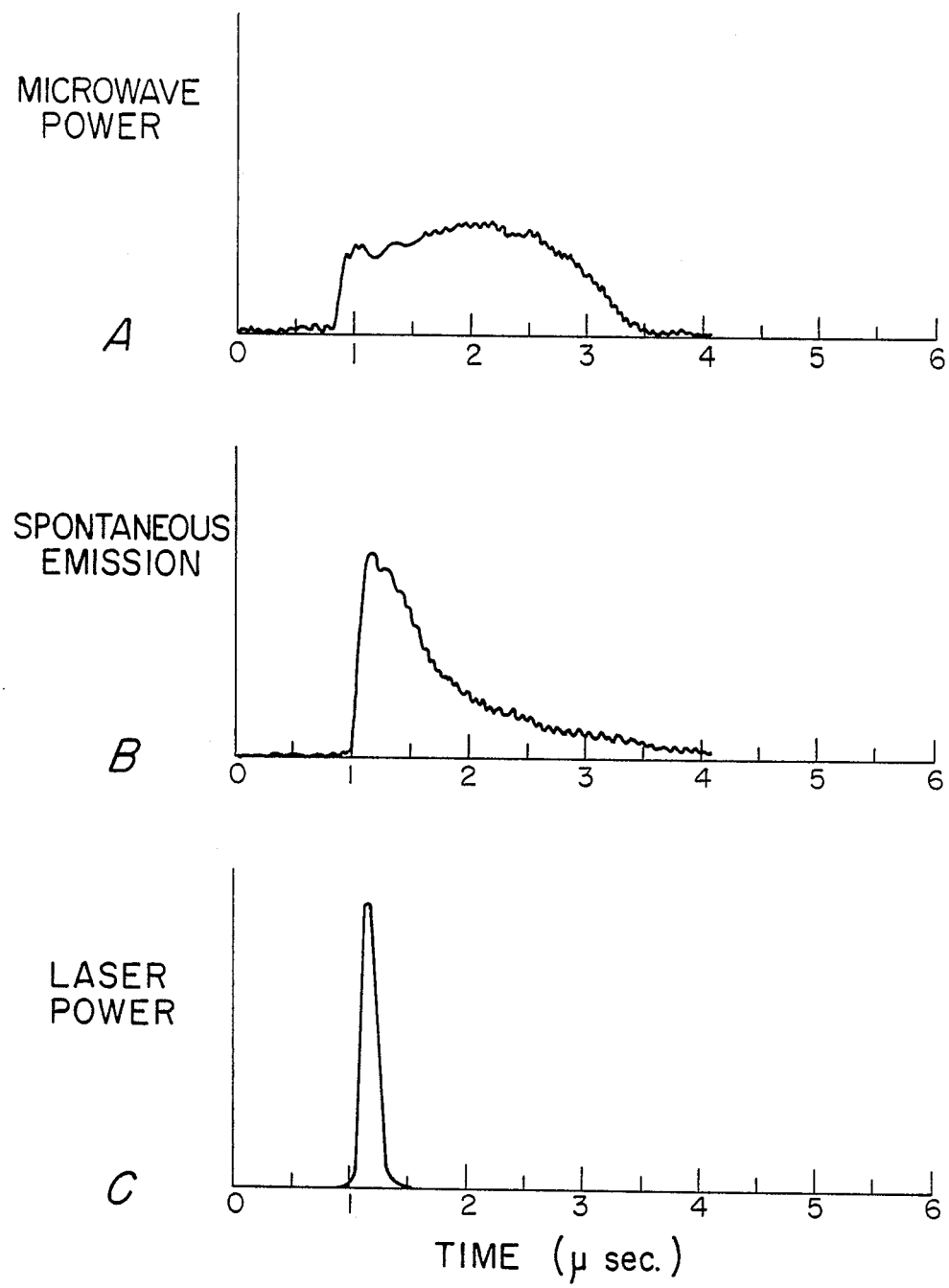
FIG. 2 shows the relative time behavior of the microwave power, spontaneous emission, and laser pulses of a laser in accordance with one embodiment of the invention.

In one example the available microwave power was limited to about 600 kW and the secondary guide consisted of a standard WR-90 waveguide containing a 3 mm i.d. quartz tube. Laser action in XeCl* was observed at several wavelengths centered at 308 nm. FIGS. 2A, 2B, and 2C show the relative time behavior of the microwave, spontaneous fluorescence, and laser pulses for a mixture of 0.3% Xe, 0.05% HCl, and 99.6% Ne at a total pressure of 2 atm. The long spontaneous emission time, over 500 ns, confirms the ability of microwaves to provide stable, long-term excitation of high pressure mixtures. While the observed laser pulse length of 150 ns is 10 times longer than those of discharge systems, it is surprisingly short relative to the fluorescence pulse length. We have not yet determined the cause of this behavior; some possible mechanisms include buildup of a transient loss, kinetic bottlenecks, inhomogeneous excitation, and thermal or acoustic distortions of the optical path.

The maximum roundtrip gain in this system was about 20%. Using 5% output coupling the peak laser output was about 500W, representing an efficiency of 0.1%. The normal repetition rate was 10 Hz, but rates up to 400 Hz were possible. It is interesting to note that our optimum gas mixture differs significantly from those normally used for avalanche discharge lasers. The insensitivity of the microwave excitation to details of the gas composition has permitted us to choose gas mixtures on the basis of basic laser performance rather than for discharge behavior.

Figure 3:
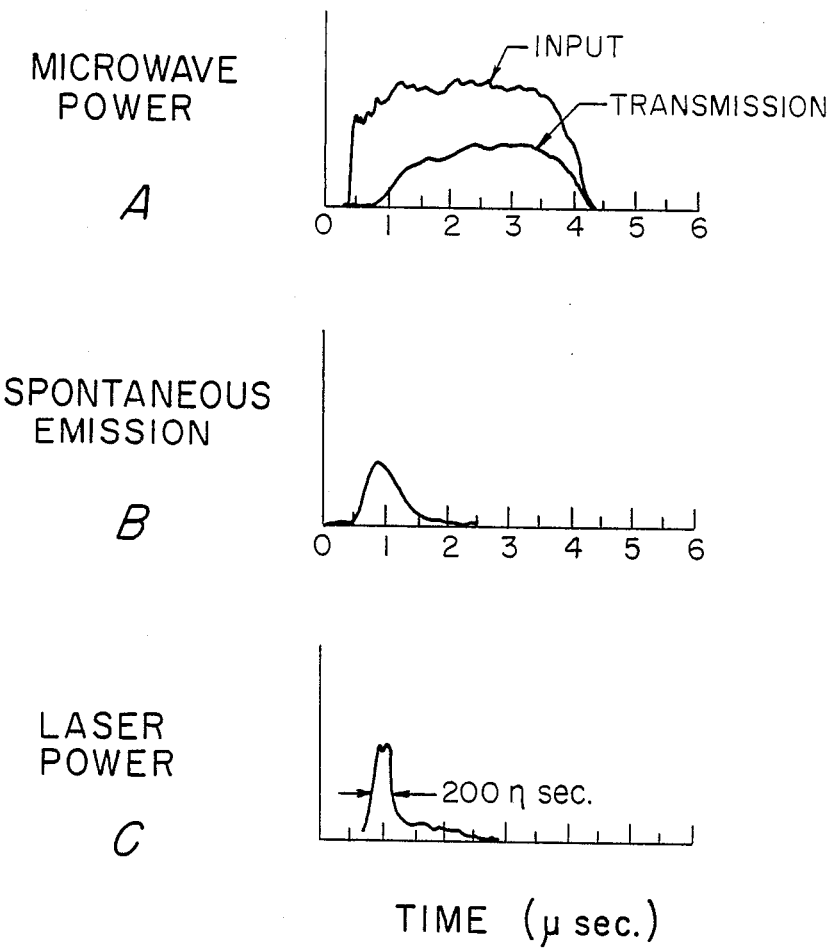
FIG. 3 shows the high power behavior of microwave transmission, spontaneous emission, and laser action of a laser in accordance with another embodiment of the invention.

In another example a cell was designed in which the secondary guide area was reduced by decreasing the waveguide height to about 5 mm, the plasma tube outside diameter. An exchangeable coupling plate was used to permit optimization of microwave power deposition into the gain medium. Best results were obtained with a slot structure over the input half of the discharge length, followed by a completely open region between the two guides. No preionization was used. FIGS. 3A, 3B and 3C show the behavior of this system. Following the initial breakdown, the microwave absorption was 100% for the first 500 ns of the pump pulse, and then decreased to 50% for the remainder of the pulse. Laser action occurred at the time of maximum fluorescence which coincided with the drop in microwave absorption. Compared to the other experiment we observed somewhat longer pulses, ~200 ns but reduced peak powers, ~250W. The net gains were higher than before, ~40% per roundtrip, so that larger output coupling could improve powers and efficiency. At this higher excitation density the maximum pulse rate was limited to 190 Hz.

The microwave absorption was studied up to total pressures of 5 atm. Although the temporal behavior of the absorption was approximately constant, the effects of finite skin depth became evident as a ring of bright fluorescence at the circumference of the plasma tube. Our qualitative observations indicate that as the pressure increases skin depths decrease and excitation becomes non-uniform. Even at a total pressure of 2 atm., a 1 mm wide bright ring was visible. However, the temporal development of this non-uniformity has not been studied and it seems likely that it develops late in the pulse and corresponds to the observed 50% decrease in absorption. Nevertheless, small skin depths and non-uniform electron density distributions across the plasma tube could ultimately limit the deposition of microwave power into high pressure gases.

Although only one lasing species was tested it will be apparent to one skilled in the art that other excimer species such as those described above can be used without departing from the spirit and scope of this invention.

It is seen that microwave pumping is a simple, practical technique for producing relatively long-pulsed excimer lasers. Pulse lengths are sufficient to allow mode-locking, good spatial mode control, and/or narrow-band frequency tuning. Such a system should be useful for generating well-controlled pulses for injecting into a high power amplifier chain. The laser can also serve as a useful stand-alone source of moderate UV power for spectroscopy, photochemistry, dye laser pumping, etc. In addition, the device is easily constructed with high-vacuum, halogen-compatible materials. The metal and quartz construction, and the absence of electrodes with their sputtering problems, along with the mature, reliable microwave technology should result in long system lifetimes and reliable hands-off operation.

What is claimed is:

1. An excimer laser comprising a resonant optical cavity containing a gas-phase lasing molecular species, and means for coupling or applying microwave energy to said lasing species whereby the atoms or molecules of the lasing molecular species are excited or pumped into their upper or energetic level from which they can emit photons and make a transition to a lower unbound unexcited state.

2. An excimer laser as in claim 1 in which the lasing species is placed in a second waveguide and a first waveguide is coupled to the second to transfer microwave energy from the first waveguide into the second to couple the energy to the lasing molecular or atom species.

3. An excimer laser as in claim 2 in which the lasing atoms or molecules are in a gas mixture, including a buffer gas.

4. An excimer laser as in claim 3 in which the gas mixture is at a pressure greater than one atmosphere.

5. An excimer laser as in claim 4 including means for circulating the gas mixture through the cavity.

6. An excimer laser as in claim 1 in which the lasing atoms or molecules are in a gas mixture, including a buffer gas.

7. An excimer laser as in claim 6 in which the gas mixture is at a pressure greater than one atmosphere.

8. An excimer laser as in claim 6 including means for circulating the gas mixture through the cavity.

9. An excimer laser as in claim 6 in which the gas mixture comprises a rare-gas-halogen-buffer.

10. An excimer laser as in claim 1 in which the lasing species is XeCl.

11. An excimer laser as in claim 1 in which the lasing species is selected from the group comprising $Ar_2$, $Kr_2$, XeCl, XeF, ArF, KrF, KrCl, XeBr, HgBr, $Xe_2$.

12. The method of pumping a lasing atom or molecular species in an excimer laser which comprises exciting or pumping said lasing atom or molecular species with microwave energy.

13. The method of claim 12 in which the microwave energy is pulsed.

14. The method of claim 13 in which the lasing atom or molecular species is in a gas mixture and the mixture is at a pressure greater than one atmosphere.

15. The method of claim 14 including the additional step of circulating the gas mixture through the excitation region.

* * * * *

UNITED STATES PATENT AND TRADEMARK OFFICE
CERTIFICATE OF CORRECTION

PATENT NO. : 4,802,183
DATED : Jan. 31, 1989
INVENTOR(S) : Stephen E. Harris, et al.

It is certified that error appears in the above-identified patent and that said Letters Patent is hereby corrected as shown below:

Title page:

Item [75] should read as follows

--Stephen E. Harris, Palo Alto; James F. Young, Stanford; Andrew J. Mendelsohn, Palo Alto, all of California; Richard J. Normandin, Ottawa, Ontario, Canada.--.

Signed and Sealed this

Sixth Day of March, 1990

Attest:

JEFFREY M. SAMUELS

Attesting Officer

Acting Commissioner of Patents and Trademarks